United States Patent [19]
Mori

[11] 4,319,810
[45] Mar. 16, 1982

[54] FOUR-GROUP LENS

[75] Inventor: Ikuo Mori, Kawasaki, Japan

[73] Assignee: Nippon Kogaku K.K., Tokyo, Japan

[21] Appl. No.: 104,842

[22] Filed: Dec. 18, 1979

[30] Foreign Application Priority Data

Dec. 29, 1978 [JP] Japan .................................. 53-163081

[51] Int. Cl.³ .............................................. G02B 9/34
[52] U.S. Cl. .................................................. 350/469
[58] Field of Search ................................ 350/469, 470

[56] References Cited

U.S. PATENT DOCUMENTS

3,672,748  6/1972  Doi et al. .
3,941,457  3/1976  Kawakami ........................... 350/469

FOREIGN PATENT DOCUMENTS

24391 of 1905  United Kingdom ................ 350/470
3799 of 1912  United Kingdom ................ 350/469

Primary Examiner—John K. Corbin
Assistant Examiner—Scott J. Sugarman
Attorney, Agent, or Firm—Fitzpatrick, Cella, Harper & Scinto

[57] ABSTRACT

A four-group lens comprises, in succession from the object side, a first group, a second group, a diaphragm, a third group and a fourth group. These four groups are formed substantially symmetrically with respect to the diaphragm. The air space between the first and second groups and the air space between the third and fourth groups are variable in accordance with a change of the photographing magnification.

4 Claims, 14 Drawing Figures

$\beta = 1/10$

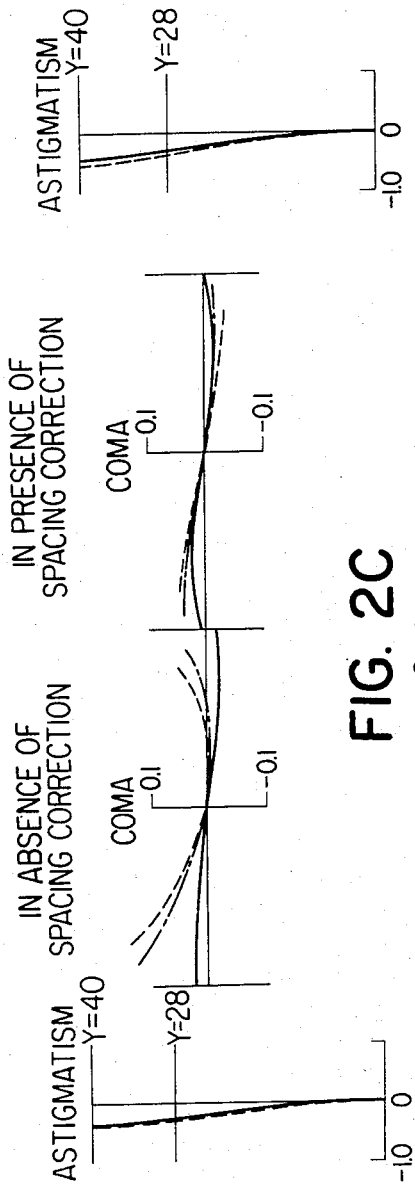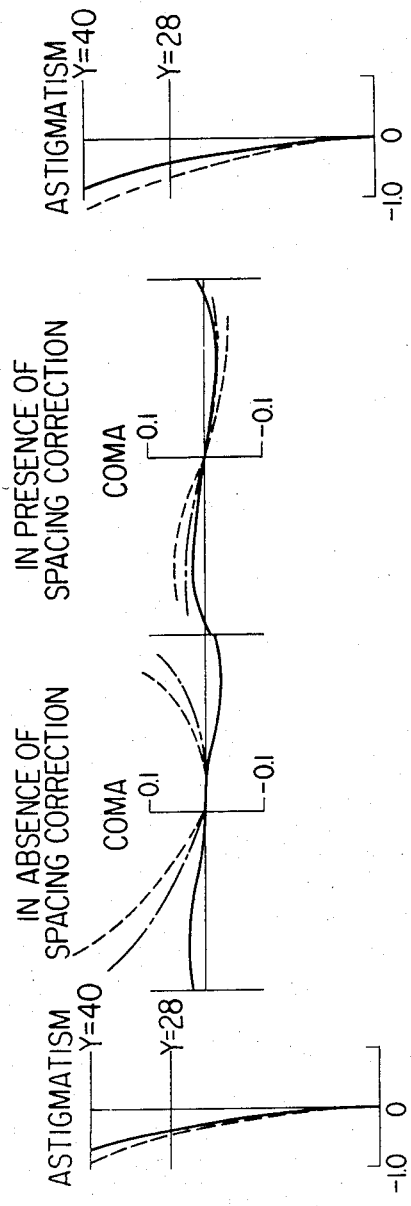

β=1/30

β=1/5

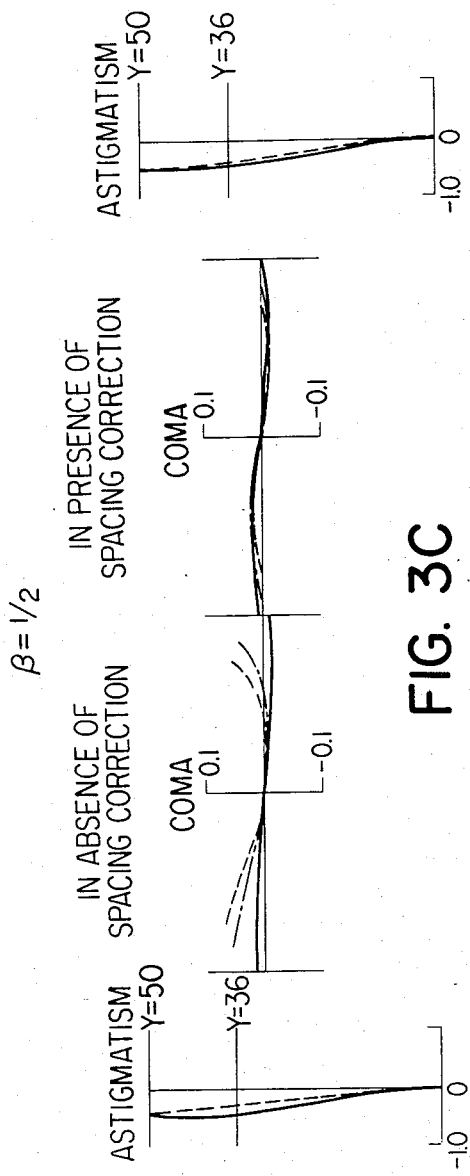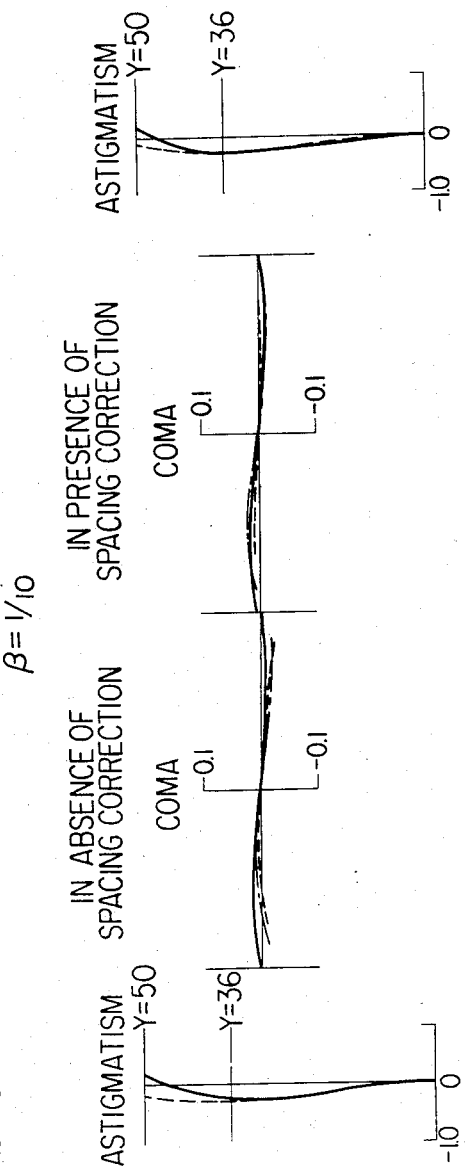

$\beta = 1/10$ $\beta = 1/50$

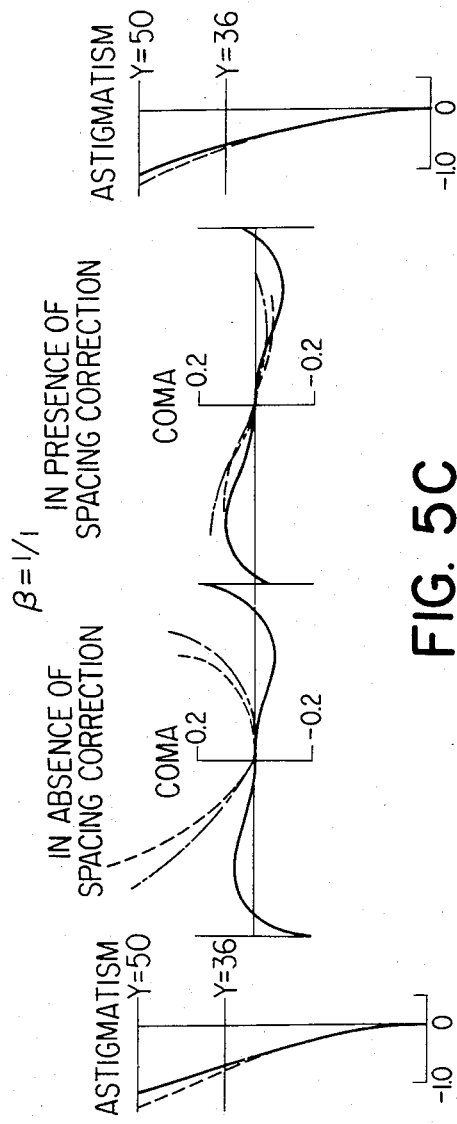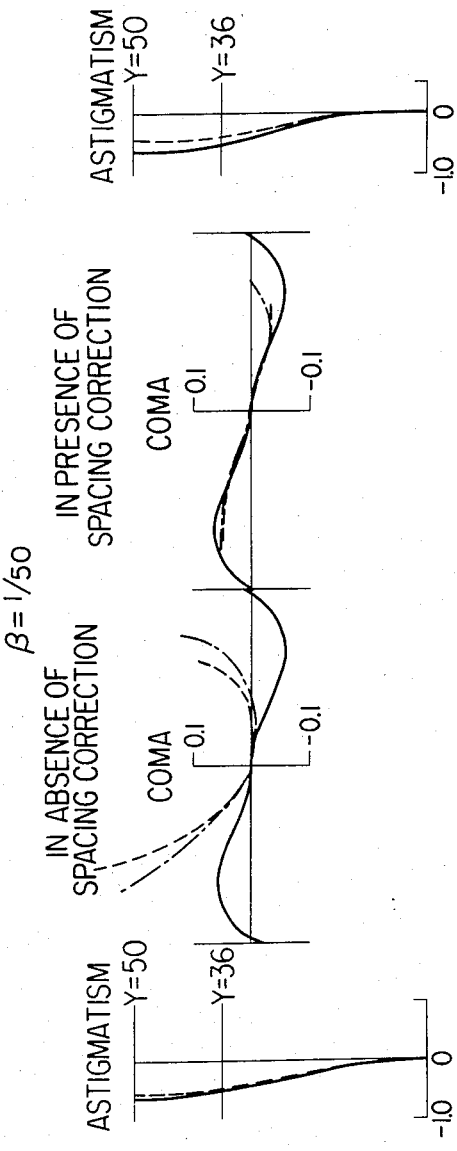

FOUR-GROUP LENS

BACKGROUND OF THE INVENTION

1. Field of the Invention

This invention relates to improvements in a copying lens comprising four groups disposed substantially symmetrically about a diaphragm.

2. Description of the Prior Art

Generally, copying lenses are required to more faithfully reproduce planar objects than ordinary photographic lenses, and lenses having a small coma and having a good planarity of image plane are desired as such lenses. Moreover, copying lenses are not used at a fixed magnification but at various magnifications and therefore must keep a good performance over a wide magnification range. However, as is well-known, if magnification is changed, lenses usually cannot maintain a performance equivalent to their original image forming performance obtained at the standard magnification. For this reason, various aberration correcting mechanisms involving changing the air spaces between lenses have been devised and these have been successful to some extent in ordinary photographic lenses, but in copying lenses which require strict aberration correction, it has been very difficult sufficiently to correct aberrations.

SUMMARY OF THE INVENTION

It is the object of the present invention to provide a four-group lens having an excellent image forming performance over a wide magnification range.

The four-group lens according to the present invention comprises, in succession from the object side, a first group, a second group, a diaphragm, a third group and a fourth group, and the first and second groups and the third and fourth group are formed substantially symmetrically with respect to the diaphragm. In such a substantially symmetrical four-group lens, variations in astigmatism and chromatic difference of magnification resulting from a change of magnification are smaller than in other lens systems because of the substantial symmetry of the lens system, but there occurs a considerable amount of asymmetric coma. This coma is the greatest factor which deteriorates the image forming performance.

Now, in such a four-group lens, the spacing A between the first and the second group and the spacing B between the third and the fourth group have an equal action with respect to astigmatism while they are not equal with respect to coma. That is, the spacing A is substantially equal with respect to the lateral aberration of oblique rays passing above and below, the optic axis in the diaphragm plane, but the spacing B affects particularly greatly oblique rays passing below the optic axis in the diaphragm plane. The reason is that the light rays passing below the optic axis of the third group are more strongly refracted upwardly. (However, this is not so if the lens is of a perfectly symmetrical construction and its design standard magnification is one-to-one magnification.)

According to the present invention, in view of such actions of the air spaces, the aggravation of coma resulting from a change of magnification can be well corrected by varying the air spaces A and B. Specifically, when magnification is greater than the design standard magnification, the first and second groups or the third and fourth groups may be moved so that the spacing A between the first and the second group is greater while, at the same time, the spacing B between the third and the fourth group is smaller, and when magnification is smaller than the design standard magnification, the first and second groups or the third and fourth groups may be moved so that the spacing A is smaller while, at the same time, the spacing B is greater. Preferably, the first and fourth groups or the second and third groups are moved together so that the sum of the air spacings A and B may be constant. According to such construction of the present invention, it is possible to bring coma back to its corrected condition at the design standard magnification while substantially negating astigmatism in the two air spaces A and B.

The invention will become more fully apparent from the following detailed description thereof taken in conjunction with the accompanying drawings.

BRIEF DESCRIPTION OF THE DRAWINGS

FIG. 2B shows various aberrations for the magnification 1/2.

FIG. 2C shows various aberrations for the magnification 1/1.

In FIGS. 2B–2E, the left-hand side shows the case where the spacings are not corrected and the right-hand side shows the case where the spacing are corrected.

FIG. 3B shows various aberrations for the magnification 1/2 in the case where the spacings are not corrected and in the case where the spacing is corrected.

FIG. 3C shows various aberrations for the magnification 1/10 in the case where the spacings are not corrected and in the case where the spacings are corrected.

FIGS. 5B, 5C and 5D show various aberrations for the magnifications 1/1, 1/2 and 1/50 in the case where the spacings are not corrected and in the case where the spacings are corrected.

DESCRIPTION OF THE PREFERRED EMBODIMENTS

Figure 1:
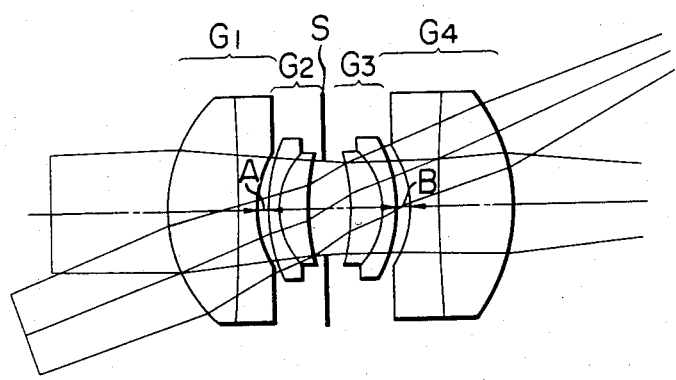
FIG. 1 shows the construction of the lens according to a first embodiment of the present invention.
Figure 2A:
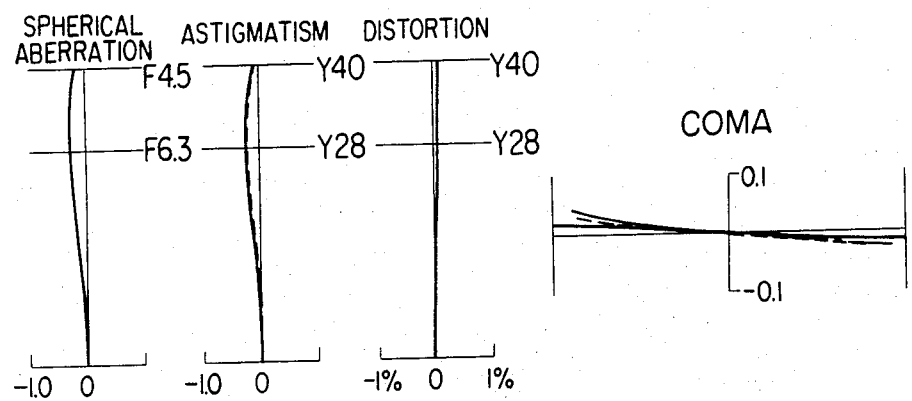
FIG. 2A shows various aberrations in the first embodiment for the design standard magnification 1/10.
Figure 2D:
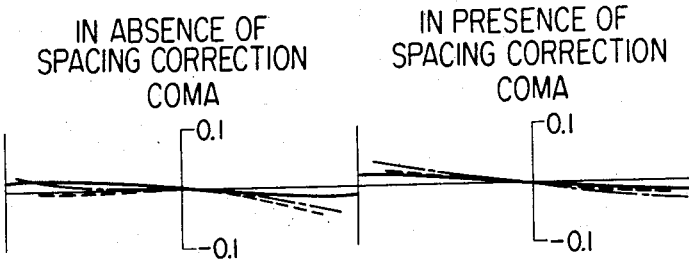
FIG. 2D shows various aberrations for the magnification 1/30.
Figure 2E:
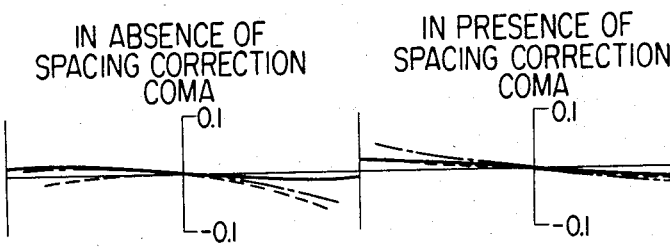
FIG. 2E shows various aberrations during the photographing of an object at infinity setting.

Embodiments of the present invention will hereinafter be described. In FIG. 1 which shows the construction of the lens according to a first embodiment of the present invention, light rays from an on-axis object point and an off-axis object point are shown. This embodiment is similar in construction to that of the U.S. Pat. No. 3,941,457. That is, a first groups G1 comprises a doublet consisting of a positive lens having its more sharply convex surface facing the object side and a negative lens having its more sharply concave surface facing the image side; a second group G2 comprises a doublet consisting of a negative meniscus lens having its convex surface facing the object side and a positive meniscus lens having its convex surface facing the object side; a third group G3 is substantially symmetrical with the second group with respect to a diaphragm S disposed between the second group and the third group and comprises a doublet consisting of a positive meniscus lens having its convex surface facing the image side and a negative meniscus lens having its convex surface facing the image side; and a fourth group G4 is substantially symmetrical with the first group with respect to the diaphragm S and comprises a doublet consisting of a negative lens having its more sharply concave surface facing the object side and a positive lens having its more sharply convex surface facing the image side. The design standard magnification of the present invention is 1/10 and the numerical data thereof are as follows:

Various aberrations in the present embodiment for the design standard magnification 1/10 are shown in FIG. 2A. Also, aberrations for the magnifications 1/2, 1/1 and 1/30 and during the photographing of an infinity object at infinity setting are shown in FIGS. 2B, 2C, 2D and 2E. In each of these Figures, to show the effect of the spacing correction according to the present invention, the left-hand side represents the case where the spacings are not corrected and the right-hand side represents the case where the spacings are corrected. From these Figures, it is seen that when the magnification is greater than the design standard magnification, the symmetry of coma can be corrected very well without so much increasing astigmatism according to the cor-

First Embodiment

Focal Length f = 100.0   F-number 4.5   Design Standard Magnification 1/10

|  |  |  | ne | ng | nc |  |
|---|---|---|---|---|---|---|
| r1 = 25.704 | | | | | | |
| | d1 = 11.424 | n1 = 1.62285 | 1.6331 | 1.61727 | | $\nu1$ = 60.4 |
| r2 = −1213.8 | | | | | | |
| | d2 = 3.57 | n2 = 1.52928 | 1.5397 | 1.5237 | | $\nu2$ = 51.1 |
| r3 = 18.307 | | | | | | |
| | d3 = variable | | | | | |
| r4 = 26.775 | | | | | | |
| | d4 = 1.142 | n3 = 1.51871 | 1.52667 | 1.51431 | | $\nu3$ = 64.2 |
| r5 = 12.709 | | | | | | |
| | d5 = 4.284 | n4 = 1.50178 | 1.50785 | 1.49845 | | $\nu4$ = 81.9 |
| r6 = 45.196 | | | | | | |
| | d6 = 6.0 | | | | | |
| r7 = −50.123 | | | | | | |
| | d7 = 5.14 | n5 = 1.50178 | 1.50785 | 1.49845 | | $\nu5$ = 81.9 |
| r8 = −11.567 | | | | | | |
| | d8 = 2.142 | n6 = 1.51871 | 1.52667 | 1.51431 | | $\nu6$ = 64.2 |
| r9 = −27.018 | | | | | | |
| | d9 = variable | | | | | |
| r10 = −18.493 | | | | | | |
| | d10 = 4.57 | n7 = 1.52928 | 1.5397 | 1.5237 | | $\nu7$ = 51.1 |
| r11 = 249.9 | | | | | | |
| | d11 = 12.281 | n8 = 1.62541 | 1.63644 | 1.61949 | | $\nu8$ = 56.9 |
| r12 = −28.787 | | | | | | |

| | | Magnification | | | |
|---|---|---|---|---|---|
| | Object Distance | 1/30 | 1/10 | ½ | 1/1 |
| d3 = A | 1.071 | 1.143 | 1.357 | 2.071 | 2.571 |
| d9 = B | 2.428 | 2.356 | 2.142 | 1.428 | 0.928 | d3 + d9 = A + B = 3.499(const.)

In the above, r1, r2, r3, ... are the curvature radii of the respective lens surfaces in the order from the object side, d1, d2, d3, ... are the center thicknesses or air spaces of the repective lenses, n1, n2, ... and $\nu1$, $\nu2$, ... are the refractive indices and the Abbe numbers, respectively, of the respective lenses, and ne, ng and nc are the refractive indices for e-line, g-line and c-line, respectively.

rection of the spacings A and B. It is also seen that when the magnification is smaller than the design standard magnification, the symmetry of coma is well maintained.

A second embodiment of the present invention comprises lenses substantially equal to those of the first embodiment shown in FIG. 1 and the design standard magnification thereof is 1/5. The numerical data of this embodiment are as follows:

Second Embodiment

Focal Length f = 100.0   F-number 5.6   Design Standard Magnification 1/5

|  |  |  | ne | ng | nc |  |
|---|---|---|---|---|---|---|
| r1 = 24.354 | | | | | | |
| | d1 = 8.432 | n1 = 1.62541 | 1.63644 | 1.61949 | | $\nu1$ = 56.9 |
| r2 = −192.942 | | | | | | |
| | d2 = 2.0 | n2 = 1.52928 | 1.5397 | 1.5237 | | $\nu2$ = 51.1 |
| r3 = 18.122 | | | | | | |
| | d3 = variable | | | | | |
| r4 = 28.298 | | | | | | |
| | d4 = 1.191 | n3 = 1.51871 | 1.52667 | 1.51431 | | $\nu3$ = 64.2 |
| r5 = 12.406 | | | | | | |
| | d5 = 3.811 | n4 = 1.50038 | 1.50645 | 1.49705 | | $\nu4$ = 81.9 |
| r6 = 42.4 | | | | | | |

-continued

Second Embodiment

| | | | | | | |
|---|---|---|---|---|---|---|
| r7 = −42.4 | d6 = 6.67 | | | | | |
| r8 = −12.406 | d7 = 3.811 | n5 = 1.50038 | 1.50645 | 1.49705 | ν5 = 81.9 | |
| r9 = −26.607 | d8 = 2.477 | n6 = 1.51871 | 1.52667 | 1.51431 | ν6 = 64.2 | |
| r10 = −18.122 | d9 = variable | | | | | |
| r11 = 192.942 | d10 = 2.0 | n7 = 1.52928 | 1.5397 | 1.5237 | ν7 = 51.1 | |
| r12 = −25.363 | d11 = 8.623 | n8 = 1.62541 | 1.63644 | 1.61949 | ν8 = 56.9 | |

| | Magnification | | |
|---|---|---|---|
| | 1/10 | 1/5 | ½ |
| d3 = A | 1.239 | 1.429 | 1.953 |
| d9 = B | 1.762 | 1.572 | 1.048 | d3 + d9 = A + B = 3.001 (const.)

Figure 3A:
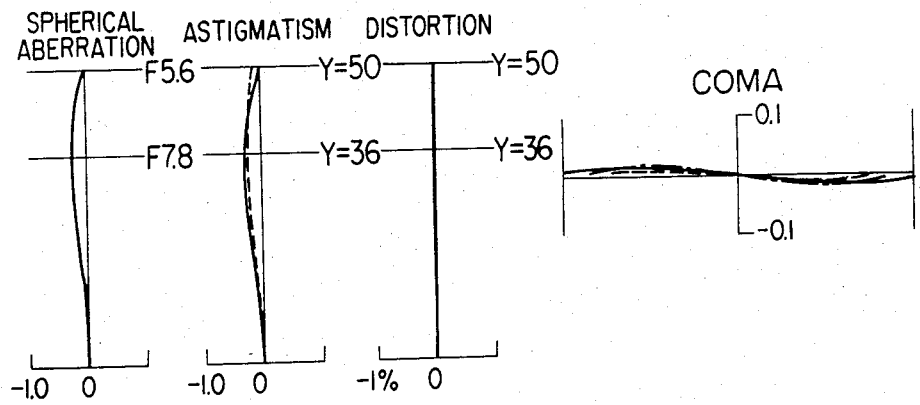
FIG. 3A shows various aberrations in a second embodiment for the design standard magnification 1/5.

Various aberrations in this embodiment at its design standard magnification are shown in FIG. 3A. Also, various aberrations at the magnifications 1/2 and 1/10 in the case where the spacings are not corrected and in the case where the spacings are corrected are shown in FIGS. 3B and 3C. From these FIGS., it is seen again that in this embodiment, coma is well corrected without aggravating astigmatism.

Figure 4:
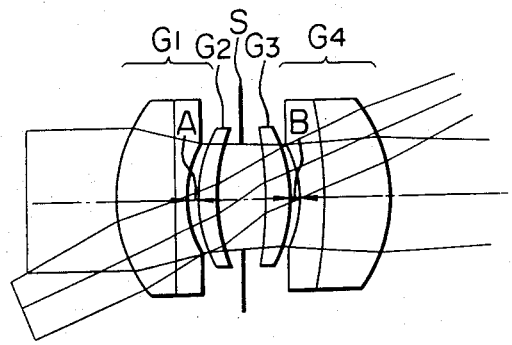
FIG. 4 shows the construction of the lens according to a third embodiment of the present invention.

In a third embodiment of the present invention, as shown in FIG. 4, the first and fourth groups are substantially similar in construction to those of the previously described two embodiments, but both the second and the third group comprise positive meniscus lenses, and the positive meniscus lens of the second group has its convex surface facing the object side and the positive meniscus lens of the third group has its convex surface facing the image side. This is known as the so-called orthotype. The design standard magnification of this embodiment is 1/10 and the numerical data thereof are as follows:

Third Embodiment

Focal Length f = 100.0    F-number 3.2    Design Standard Magnification 1/10
nd

| | | | |
|---|---|---|---|
| r1 = 30.080 | d1 = 12.647 | n1 = 1.744 | ν1 = 44.9 |
| r2 = 409.165 | d2 = 2.48 | n2 = 1.64831 | ν2 = 33.8 |
| r3 = 20.037 | d3 = variable | | |
| r4 = 31.692 | d4 = 4.464 | n3 = 1.66446 | ν3 = 35.9 |
| r5 = 49.596 | d5 = 9.175 | | |
| r6 = −91.256 | d6 = 4.464 | n4 = 1.62041 | ν4 = 60.3 |
| r7 = −36.403 | d7 = variable | n5 = 1.64831 | ν5 = 33.8 |
| r8 = −23.930 | d8 = 5.704 | n6 = 1.717 | ν6 = 47.9 |
| r9 = −136.388 | d9 = 13.887 | | |
| r10 = −33.428 | Bf = 72.988 | | |

| | Magnification | | | |
|---|---|---|---|---|
| | 1/50 | 1/10 | ½ | 1/1 |
| d3 = A | 1.934 | 2.058 | 2.554 | 2.976 |
| d7 = B | 1.910 | 1.786 | 1.290 | 0.868 | d3 + d7 = A + B = 3.844 (const.)

Figure 5A:
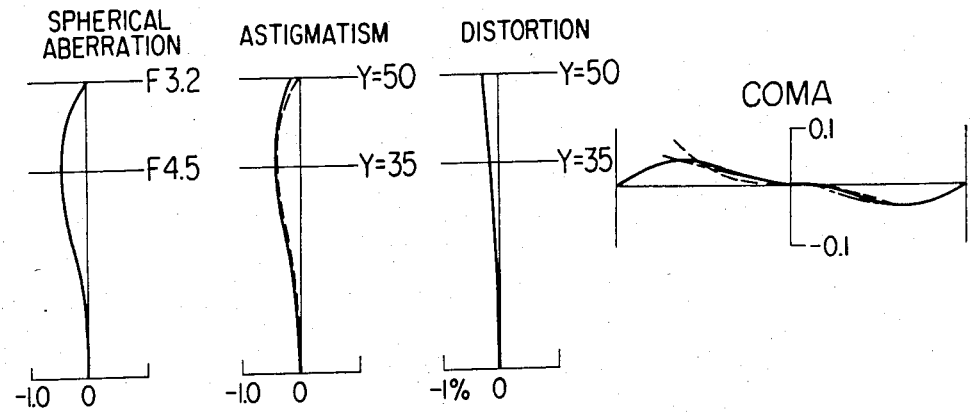
FIG. 5A shows various aberrations for the design standard magnification 1/10.
Figure 5D:
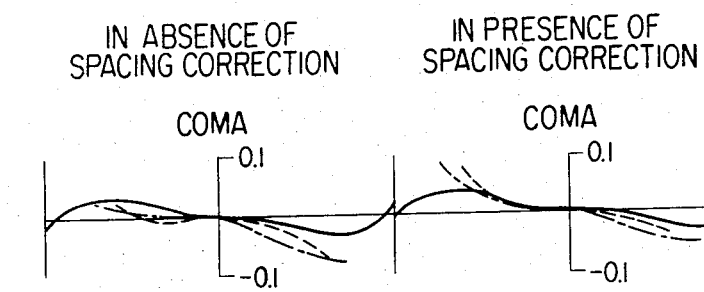

Various aberrations in this embodiment at its design standard magnification are shown in FIG. 5A, and various aberrations at the magnifications 1/1, 1/2 and 1/50 in the case where the spacings are not corrected and in the case where the spacings are corrected are shown in FIGS. 5B, 5C and 5D. It is seen again that in this embodiment, coma is well corrected.

In any of the above-described embodiments, the spacings A and B are varied by the same amount and the sum of the two spacings (A+B) is always constant. In such construction, the bodytube for integrally moving the first and fourth groups or the second and third groups becomes relatively simple to construct, but depending on the tendency of the aberration fluctuation, it is of course possible to construct the lens so that the amounts of variation of the two spacings differ from each other.

As has been described above, according to the present invention, an excellent four-group lens is achieved in which a good corrected condition, especially, of coma is maintained over a wide magnification range with the design standard magnification as the center.

The four-group lens according to the present invention is not restricted to a copying lens but it is of course usable also as an ordinary photographic lens.

I claim:

1. A four-group lens comprising, in succession from the object side, a first group, a second group, a diaphragm, a third group and a fourth group and being formed substantially symmetrically with respect to said diaphragm, and wherein said first group comprises a doublet consisting of a positive lens having its more sharply convex surface facing the object side and a negative lens having its more sharply concave surface facing the image side, said second group comprises a doublet or a single meniscus lens having its convex surface facing the object side, said third group comprises a doublet or a single meniscus lens having its convex surface facing the image side, said second group comprises a doublet consisting of a negative lens having its more sharply concave surface facing the object side and a positive lens having its more sharply convex surface facing the image side, the improvement residing in that said first and fourth groups are movable integrally in the direction of the optic axis with respect to said second and third groups in such a manner that when magnification is greater than the design standard the spacing between the first and the second group is greater while at the same time the spacing between the third and the fourth group is smaller maintaining the sum of the spacing between the first and the second group and the spacing between the third and the fourth group constant, and when magnification is smaller than the design standard the spacing between the first and the second group is smaller while at the same time the spacing between the third and the fourth group is greater maintaining the sum of the spacing between the first and the second group and the spacing between the third and the fourth group constant.

2. A four-group lens according to claim 1, wherein numerical data are as follows:

| Focal Length f = 100.0 | F-number 4.5 | Design Standard Magnification 1/10 | | |
|---|---|---|---|---|
| | | ne | ng | nc |
| r1 = 25.704 | | | | |
| | d1 = 11.424 | n1 = 1.62285  1.6331  1.61727  ν1 = 60.4 | | |
| r2 = −1213.8 | | | | |
| | d2 = 3.57 | n2 = 1.52928  1.5397  1.5237  ν2 = 51.1 | | |
| r3 = 18.307 | | | | |
| | d3 = variable | | | |
| r4 = 26.775 | | | | |
| | d4 = 1.142 | n3 = 1.51871  1.52667  1.51431  ν3 = 64.2 | | |
| r5 = 12.709 | | | | |
| | d5 = 4.284 | n4 = 1.50178  1.50785  1.49845  ν4 = 81.9 | | |
| r6 = 45.196 | | | | |
| | d6 = 6.0 | | | |
| r7 = −50.123 | | | | |
| | d7 = 5.14 | n5 = 1.50178  1.50785  1.49845  ν5 = 81.9 | | |
| r8 = −11.567 | | | | |
| | d8 = 2.142 | n6 = 1.51871  1.52667  1.51431  ν6 = 64.2 | | |
| r9 = −27.018 | | | | |
| | d9 = variable | | | |
| r10 = −18.493 | | | | |
| | d10 = 4.57 | n7 = 1.52928  1.5397  1.5237  ν7 = 51.1 | | |
| r11 = 249.9 | | | | |
| | d11 = 12.281 | n8 = 1.62541  1.63644  1.61949  ν8 = 56.9 | | |
| r12 = −28.787 | | | | |

| | Object Distance | Magnification | | | |
|---|---|---|---|---|---|
| | | 1/30 | 1/10 | ½ | 1/1 |
| d3 = A | 1.071 | 1.143 | 1.357 | 2.071 | 2.571 |
| d9 = B | 2.428 | 2.356 | 2.142 | 1.428 | 0.928 | d3 + d9 = A + B = 3.499(const.)

3. A four-group lens according to claim 1, wherein numerical data are as follows:

| Focal Length f = 100.0 | F-number 5.6 | Design Standard Magnification 1/5 | | |
|---|---|---|---|---|
| | | ne | ng | nc |
| r1 = 24.354 | | | | |
| | d1 = 8.432 | n1 = 1.62541  1.63644  1.61949  ν1 = 56.9 | | |
| r2 = −192.942 | | | | |
| | d2 = 2.0 | n2 = 1.52928  1.5397  1.5237  ν2 = 51.1 | | |
| r3 = 18.122 | | | | |
| | d3 = variable | | | |
| r4 = 28.298 | | | | |
| | d4 = 1.191 | n3 = 1.51871  1.52667  1.51431  ν3 = 64.2 | | |
| r5 = 12.406 | | | | |
| | d5 = 3.811 | n4 = 1.50038  1.50645  1.49705  ν4 = 81.9 | | |
| r6 = 42.4 | | | | |
| | d6 = 6.67 | | | |
| r7 = −42.4 | | | | |
| | d7 = 3.811 | n5 = 1.50038  1.50645  1.49705  ν5 = 81.9 | | |
| r8 = −12.406 | | | | |
| | d8 = 2.477 | n6 = 1.51871  1.52667  1.51431  ν6 = 64.2 | | |
| r9 = −26.607 | | | | |
| | d9 = variable | | | |
| r10 = −18.122 | | | | |
| | d10 = 2.0 | n7 = 1.52928  1.5397  1.5237  ν7 = 51.1 | | |
| r11 = 192.942 | | | | |
| | d11 = 8.623 | n8 = 1.62541  1.63644  1.61949  ν8 = 56.9 | | |
| r12 = −25.363 | | | | |

| | Magnification | | |
|---|---|---|---|
| | 1/10 | 1/5 | ½ |
| d3 = A | 1.239 | 1.429 | 1.953 |
| d9 = B | 1.762 | 1.572 | 1.048 | d3 + d9 = A + B = 3.001 (const.)

4. A four-group lens according to claim 1, wherein numerical data are as follows:

Focal Length f = 100.0   F-number 3.2   Design Standard Magnification 1/10

-continued

| | nd | | |
|---|---|---|---|
| r1 = 30.080 | | | |
| | d1 = 12.647 | n1 = 1.744 | ν1 = 44.9 |
| r2 = 409.165 | | | |
| | d2 = 2.48 | n2 = 1.64831 | ν2 = 33.8 |
| r3 = 20.037 | | | |
| | d3 = variable | | |
| r4 = 31.692 | | | |
| | d4 = 4.464 | n3 = 1.66446 | ν3 = 35.9 |
| r5 = 49.596 | | | |
| | d5 = 9.175 | | |
| r6 = −91.256 | | | |
| | d6 = 4.464 | n4 = 1.62041 | ν4 = 60.3 |
| r7 = −36.403 | | | |
| | d7 = variable | n5 = 1.64831 | ν5 = 33.8 |
| r8 = −23.930 | | | |
| | d8 = 5.704 | n6 = 1.717 | ν6 = 47.9 |
| r9 = −136.388 | | | |
| | d9 = 13.887 | | |
| r10 = −33.428 | | | |
| | Bf = 72.988 | | |

| | Magnification | | | |
|---|---|---|---|---|
| | 1/50 | 1/10 | ½ | 1/1 |
| d3 = A | 1.934 | 2.058 | 2.554 | 2.976 |
| d7 = B | 1.910 | 1.786 | 1.290 | 0.868 | d3 + d7 = A + B = 3.844 (const.)

* * * * *